United States Patent
Buxton et al.

(10) Patent No.: US 12,124,719 B2
(45) Date of Patent: Oct. 22, 2024

(54) SUPERBLOCK SIZE MANAGEMENT IN NON-VOLATILE MEMORY DEVICES

(71) Applicant: Kioxia Corporation, Tokyo (JP)

(72) Inventors: Neil Buxton, Oxfordshire (GB); Steven Wells, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/577,888

(22) Filed: Jan. 18, 2022

(65) Prior Publication Data

US 2023/0229326 A1 Jul. 20, 2023

(51) Int. Cl.
*G06F 12/00* (2006.01)
*G06F 3/06* (2006.01)

(52) U.S. Cl.
CPC ............ *G06F 3/064* (2013.01); *G06F 3/0619* (2013.01); *G06F 3/0634* (2013.01); *G06F 3/0659* (2013.01); *G06F 3/0679* (2013.01)

(58) Field of Classification Search
CPC ...... G06F 3/064; G06F 3/0619; G06F 3/0634; G06F 3/0659; G06F 3/0679
See application file for complete search history.

(56) References Cited

U.S. PATENT DOCUMENTS

| | | | |
|---|---|---|---|
| 2010/0180069 A1* | 7/2010 | Yeh ..................... | G06F 12/0246 |
| | | | 711/E12.008 |
| 2018/0011762 A1* | 1/2018 | Klein .................. | G06F 11/1072 |
| 2022/0083223 A1* | 3/2022 | Choi ..................... | G06F 3/0614 |
| 2022/0342563 A1* | 10/2022 | Cariello ................ | G06F 3/0656 |
| 2023/0061800 A1* | 3/2023 | Muchherla ............. | G06F 3/064 |

* cited by examiner

*Primary Examiner* — Daniel D Tsui
(74) *Attorney, Agent, or Firm* — Foley & Lardner LLP (57) ABSTRACT

Various implementations described herein relate to systems and methods for managing superblocks, including determining superblocks, including first and second superblocks, in a non-volatile memory storage. The non-volatile memory storage includes independent locations that may be planes or dies. The first superblock includes first blocks corresponding to first independent locations, and the second superblock includes second blocks corresponding to second independent locations. A first number of the first independent locations is less than a number of the independent locations. A second number of the second plurality of independent locations is less than the number of the independent locations.

17 Claims, 6 Drawing Sheets

SUPERBLOCK SIZE MANAGEMENT IN NON-VOLATILE MEMORY DEVICES

TECHNICAL FIELD

The present disclosure relates generally to non-volatile memory storage device such as Solid State Drives (SSDs), and in particular, to managing superblocks.

BACKGROUND

A non-volatile memory storage device such as Solid State Drive (SSD) may include superblock structures each created by arranging physical blocks from different dies (e.g., NAND dies) or different planes of the dies as a single structure to support redundancy and protection against one or more of the constituent blocks failing. Such a superblock is commonly referred to as a Redundant Arrays of Independent Disk (RAID) structure as the constituent blocks share similarities with redundancy techniques (e.g., RAID5 or RAID6). Superblocks may be commonly used for enterprise and datacenter implementation.

An SSD starts its life with a number of initial bad blocks as manufactured. During the lifetime of the SSD, various types of stress induce additional grown bad blocks. Moreover, a part of a die (e.g., whole planes of the die) or a whole die may fail, thus creating a large number of grown bad blocks.

Accordingly, non-volatile memory storage devices must be capable of effectively and efficiently addressing the bad blocks.

SUMMARY

Some arrangements relate to systems, methods, and non-transitory computer-readable media comprising computer-readable instructions for determining a plurality of superblocks in a non-volatile memory storage. The plurality of superblocks includes a first superblock and a second superblock. The non-volatile memory storage includes available independent locations. The available independent locations include a first plurality of independent locations and a second plurality of independent locations. The first superblock includes a first plurality of blocks corresponding to the first plurality of independent locations. At least one block of the first plurality of blocks is from each of the first plurality of independent locations. The second superblock includes a second plurality of blocks corresponding to the second plurality of independent locations. At least one block of the second plurality of blocks is from each of the second plurality of independent locations. A number of the first plurality of independent locations is less than a number of the available independent locations. A number of the second plurality of independent locations is less than the number of the available independent locations. The first plurality of independent locations includes at least one independent location that is different from any independent location of the second plurality of independent locations. Data is stored in or read from the plurality of superblocks.

DETAILED DESCRIPTION

The present disclosure relate to systems, methods, apparatuses, and non-transitory computer-readable media for arranging non-volatile storage media in a storage device (e.g., an SSD) into superblock structures for providing Error Correction Code (ECC) and redundancy protection (e.g., RAID) to maintain a fixed size for the superblock and to provide consistent performance as blocks of the superblock fail. In some arrangements, blocks in an SSD are arranged in superblocks, each of which has a superblock size that remains fixed, and consistent performance of the superblocks is maintained throughout the lifetime of the SSD, despite of initial bad blocks and grown bad blocks, plane and die failures, and so on. As referred to herein, a superblock structure refers to a plurality of blocks grouped together with redundancy protection and ECC among those blocks. The grouping, the redundancy protection, and ECC are implemented by a controller, for example, on its firmware or software. If one block in a superblock fails, then the data stored in the failed block can be recovered using data stored on other blocks of the superblock based on ECC (e.g., RAID).

A non-volatile memory of an SSD may have a number (e.g., M) of independent block locations. In some arrangements, M refers to a number of total dies in the non-volatile memory. In some arrangements, M refers to a number of total dies in the non-volatile memory that can be used for superblocks or are available (healthy, not bad) for the superblock structure. In some arrangements, M refers to a number of total planes in the non-volatile memory. In some arrangements, M refers to a number of total planes in the non-volatile memory that can be used for superblocks or are available for (healthy, not bad) the superblock structure.

Each of the M independent block location is defined with respect to a die, or in case of multi-plane dies, with respect to a plane of a die. In a conventional SSD, each superblock uses all M independent block locations. That is, each superblock of the conventional SSD includes a block from each of the M dies or each the M planes of the non-volatile memory.

When all M available independent locations are utilized to form a superblock, a bad block in the superblock is conventionally replaced by another block from the same independent block location (e.g., the same die or the same plane of the die) to maintain the property of independence and to maintain performance. Specifically, performance of the superblock is significantly reduced when there is a greater concentration of block usage on any given die and/or plane.

A large number of bad blocks will result in the superblocks having fewer constituent blocks. Therefore, the superblocks will become smaller in size and have reduced performance due to degraded parallelism. In a bad plane or a bad die where all the blocks on an independent location (e.g., all blocks in a plane or all blocks in a die) fail, all superblocks of the non-volatile memory reduces in size and performance, given that no available block exists in the same location after the plane or die has failed. In the example in which each plane has an independent block location, the failure of a plane will effective reduce the superblock size from M to M-1. In the example in which each die has an independent block location, the failure of a die will effective reduce the superblock size from M to M-1.

Figure 1:
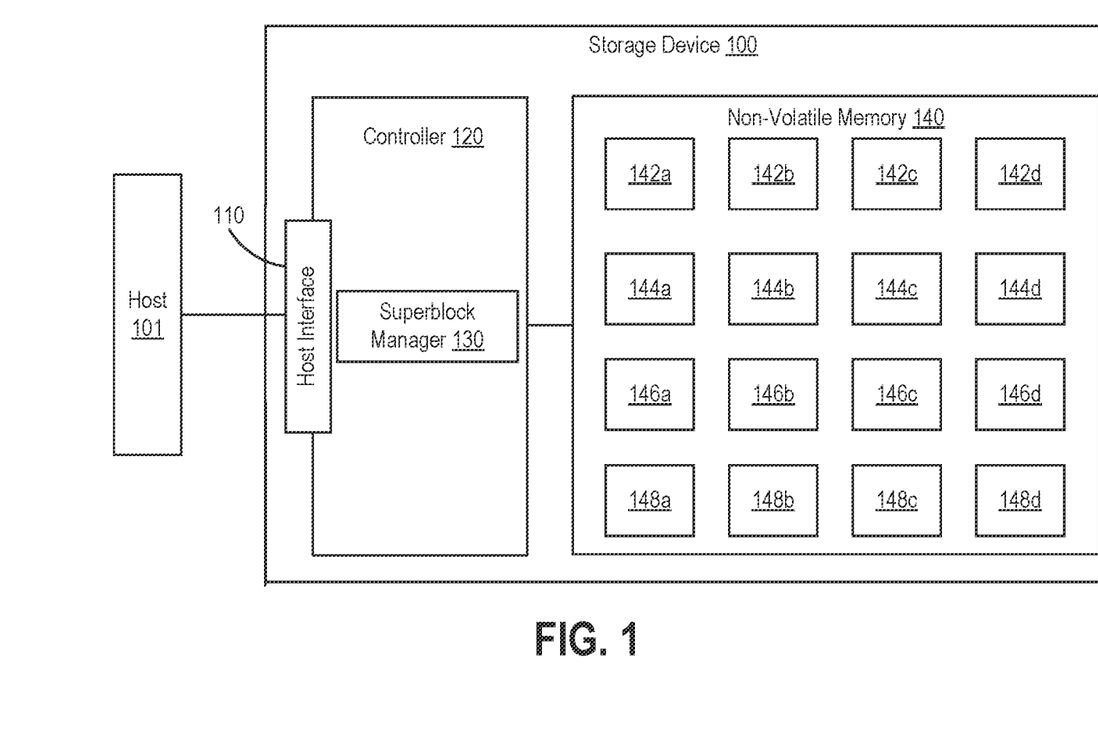
FIG. 1 shows a block diagram of an example storage device, according to some arrangements.

To assist in illustrating the present implementations, FIG. 1 shows a block diagram of a system including a storage device 100 coupled to a host 101 according to some implementations. In some examples, the host 101 can be a user device operated by a user. The host 101 may include an Operating System (OS), which is configured to provide a file system and applications that use the file system. The file system communicates with the storage device 100 (e.g., a controller 120 of the storage device 100) over a suitable wired or wireless communication link or network to manage storage of data in the storage device 100.

In that regard, the file system of the host 101 sends data to and receives data from the storage device 100 using a suitable host interface 110 of the storage device 100. The host interface 110 allows the software (e.g., the file system) of the host 101 to communicate with the storage device 100 (e.g., the controller 120). While the host interface 110 is conceptually shown as a block between the host 101 and the storage device 100, the host interface 110 can include one or more controllers, one or more namespaces, ports, transport mechanism, and connectivity thereof. To send and receive data, the software or file system of the host 101 communicates with the storage device 100 using a storage data transfer protocol running on the host interface 110. Examples of the protocol include but is not limited to, the Serial Attached Small Computer System Interface (SAS), Serial AT Attachment (SATA), and Non-Volatile Memory Express (NVMe) protocols. The host interface 110 includes hardware (e.g., controllers) implemented on the host 101, the storage device 100 (e.g., the controller 110), or another device operatively coupled to the host 101 and/or the storage device 100 via one or more suitable networks. The host interface 110 and the storage protocol running thereon also includes software and/or firmware executed on the hardware.

In some examples, the storage device 100 is located in a datacenter (not shown for brevity). The datacenter may include one or more platforms, each of which supports one or more storage devices (such as but not limited to, the storage device 100). In some implementations, the storage devices within a platform are connected to a Top of Rack (TOR) switch and can communicate with each other via the TOR switch or another suitable intra-platform communication mechanism. In some implementations, at least one router may facilitate communications among the storage devices in different platforms, racks, or cabinets via a suitable networking fabric. Examples of the storage device 100 include non-volatile devices such as but are not limited to, an SSD, a Non-Volatile Dual In-line Memory Module (NVDIMM), a Universal Flash Storage (UFS), a Secure Digital (SD) device, and so on.

The storage device 100 includes at least a controller 120 and a non-volatile memory 140. Other components of the storage device 100 are not shown for brevity. The non-volatile memory 140 includes NAND flash memory devices. Each of the NAND flash memory devices includes one or more of the NAND flash dies 142a-142d, 144a-144d, 146a-146d, and 148a-148d, which are non-volatile memory capable of retaining data without power. Thus, the NAND flash memory devices refer to multiple NAND flash memory devices or dies within the non-volatile memory 140. The non-volatile memory 140 can therefore be referred to a memory array of dies as shown. Each of the dies 142a-142d, 144a-144d, 146a-146d, and 148a-148d has one or more planes. Each plane has multiple blocks, and each block has multiple pages.

The dies 142a-142d, 144a-144d, 146a-146d, and 148a-148d can be arranged in one or more memory communication channels connected to the controller 120. For example, dies 142a-d can be configured on one memory channel, dies 144a-d on another, and so on. While the 16 dies 142a-142d, 144a-144d, 146a-146d, and 148a-148d are shown in FIG. 1, the non-volatile memory 140 can include any suitable number of non-volatile memory dies that are arranged in one or more channels in communication with the controller 120.

While the dies 142a-142d, 144a-144d, 146a-146d, and 148a-148d are shown as an example implementation of the non-volatile memory 140, other examples of non-volatile memory technologies for implementing the non-volatile memory 140 include but are not limited to, Magnetic Random Access Memory (MRAM), Phase Change Memory (PCM), Ferro-Electric RAM (FeRAM), Resistive RAM (ReRAM), and so on that have M independent locations for forming a superblock. The superblock management mechanisms described herein can be likewise implemented on memory systems using such memory technologies and other suitable memory technologies.

Examples of the controller 120 include but are not limited to, an SSD controller (e.g., a client SSD controller, a datacenter SSD controller, an enterprise SSD controller, and so on), a UFS controller, or an SD controller, and so on.

The controller 120 can combine raw data storage in the dies 142a-142d, 144a-144d, 146a-146d, and 148a-148d such that those dies 142a-142d, 144a-144d, 146a-146d, and 148a-148d function as a single storage. The controller 120 can include processors, microcontrollers, central processing units (CPUs), a cache, buffers (e.g., buffers), error correction systems, data encryption systems, a Flash Translation Layer (FTL), a mapping table, a flash interface, and so on. Such functions can be implemented in hardware, software, and firmware or any combination thereof. In some arrangements, the software/firmware of the controller 120 can be stored in the non-volatile memory 140 or in any other suitable computer readable storage medium.

The controller 120 includes suitable processing and memory capabilities for executing functions described herein, among other functions. The controller 120 manages various features for the non-volatile memory 140, including but not limited to, I/O handling, reading, writing/programming, erasing, monitoring, logging, error handling, garbage collection, wear leveling, logical to physical address mapping, data protection (encryption/decryption), and the like. Thus, the controller 120 provides visibility to the dies 142a-142d, 144a-144d, 146a-146d, and 148a-148d.

In some arrangements, the controller 120 includes a superblock manager 130 configured to manage forming and maintaining the superblocks in the manner described herein. For example, the superblock manager 130 can form superblocks from the dies 142a-142d, 144a-144d, 146a-146d, and 148a-148d by selecting or reselecting block locations (e.g., those dies 142a-142d, 144a-144d, 146a-146d, and 148a-148d or planes thereof) that form the superblocks. The superblock manager 130 can be implemented using the processing and memory capabilities of the controller 120. The superblock manager 130 can be firmware or software or hardware running on the controller 120 and stored as codes in one or more suitable non-transitory memory devices. In some examples, the superblock manager 130 stores a list of blocks (e.g., a list of physical addresses of the blocks) for each superblock in a local memory and/or in the non-volatile memory 140.

Figure 2:
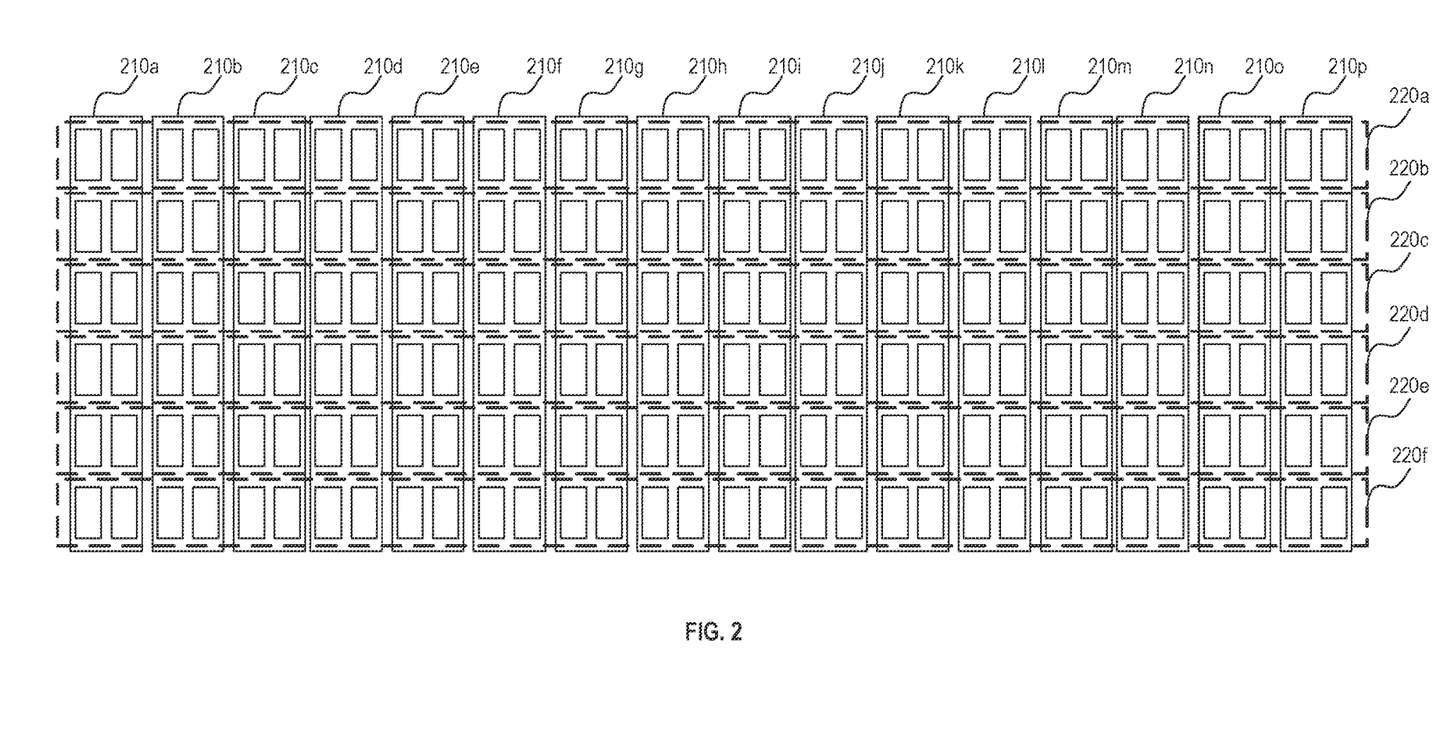
FIG. 2 is a schematic diagram illustrating superblock formation.

FIG. 2 is a schematic diagram illustrating superblock formation. Referring to FIGS. 1 and 2, a non-volatile memory of a storage device, such as the non-volatile memory 140 of the storage device 100, includes dies 210a, 210b, 210c, 210d, 210e, 210f, 210g, 210h, 210i, 210j, 210k, 210l, 210m, 210n, 210o, and 210p (collectively 210a-210p). Each of the 16 dies 210a-210p may be a die such as but not limited to, dies 142a-142d, 144a-144d, 146a-146d, and 148a-148d.

Each of the dies 210a-210p includes 12 blocks, each of which is denoted as a rectangle. The 12 blocks are shown for illustrative purposes. It should be understood that a die may have any number of blocks. Blocks arranged along a vertical column are located on a same plane. As shown, each of the dies 210a-210p has two planes, each plane includes six blocks. In some examples, each of the M independent locations corresponds to a plane. In that regard, there are M=32 independent locations, as there are 32 total planes.

Conventionally, as shown in FIG. 2, the superblock manager 130 may select a block from each of the M independent locations to form a superblock. Thus, superblocks 220a, 220b, 220c, 220d, 220e, and 220f (collectively 220a-220f) are formed. Each of the superblocks 220a-220f is formed with a block from each plane of the dies 210a-210p. Accordingly, each of the superblocks 220a-220f is formed using M=32 independent locations. Such mechanism is referred to as creating full-width superblocks.

Each of the superblocks 220a-220f has designated block (s) for RAID protection, referred to as RAID protection block(s). RAID protection data can be encoded using suitable codec algorithms such as Reed-Solomon (RS) or Parity (XOR) encoding, allowing data in failed blocks to be recovered.

As discussed herein, when all M available independent locations are utilized to form a superblock, a bad block in the superblock is conventionally replaced by another block from the same independent block location (e.g., the same die or the same plane of the die). A large number of bad blocks will result in the superblocks having fewer constituent blocks. Therefore, the superblocks will become smaller in size and have reduced performance. If an entire plane or die fails, all superblocks 220a-220f reduce in size and performance, given that no available block in the same independent location exists after the plane or die has failed. For instance, if the entire die 210f fails, each of the superblocks 220a-220f would be left with 30 independent locations.

Figure 3:
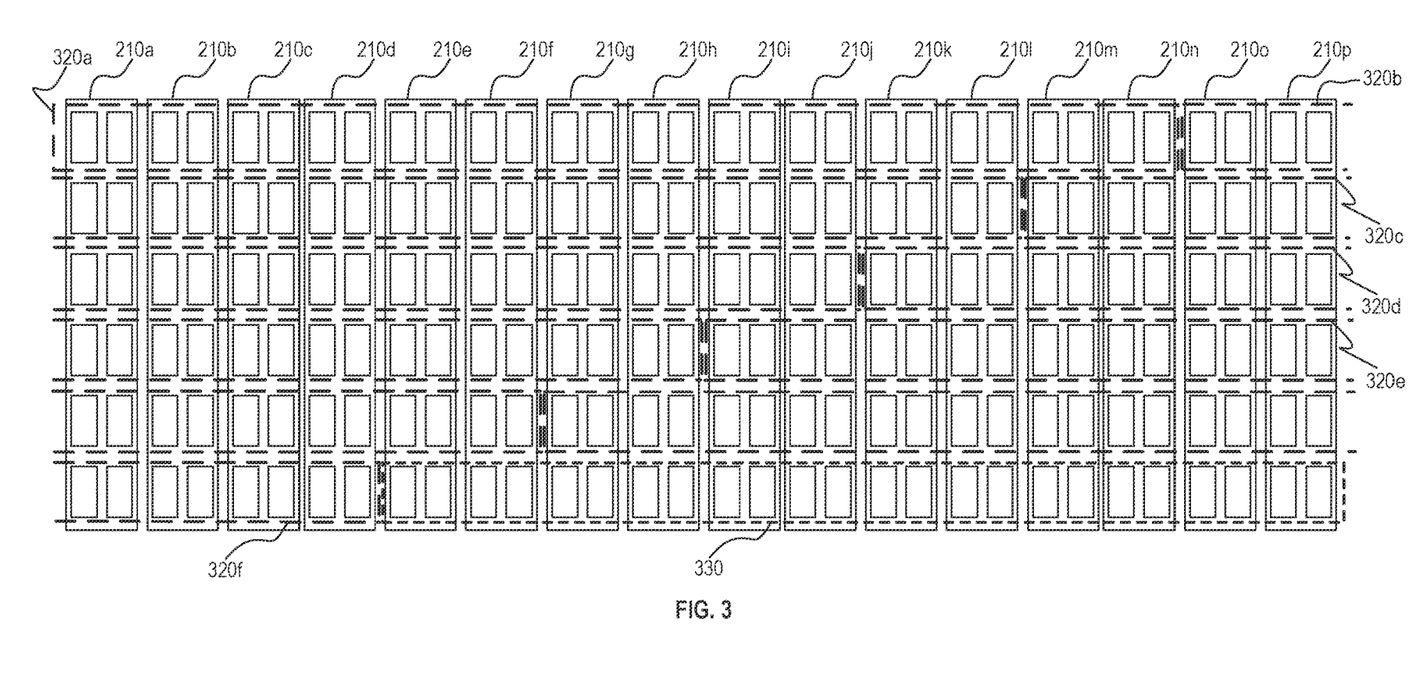
FIG. 3 is a schematic diagram illustrating initial superblock formation, according to some arrangements.

FIG. 3 is a schematic diagram illustrating initial superblock formation, according to some arrangements. Referring to FIGS. 1 and 3, a non-volatile memory of a storage device, such as the non-volatile memory 140 of the storage device 100, includes the dies 210a, 210b, 210c, 210d, 210e, 210f, 210g, 210h, 210i, 210j, 210k, 210l, 210m, 210n, 210o, and 210p (collectively 210a-210p) as described with reference to FIG. 2. As described, each of the 16 dies 210a-210p may be a die such as but not limited to, dies 142a-142d, 144a-144d, 146a-146d, and 148a-148d.

As described, each of the dies 210a-210p includes 12 blocks, each of which is denoted as a rectangle. The 12 blocks are shown for illustrative purposes. It should be understood that a die may have any number of blocks. Blocks arranged along a vertical column are located on a same plane. As shown, each of the dies 210a-210p has two planes, each plane includes six blocks. In some examples, each of the M independent locations corresponds to a plane. In that regard, there are M=32 independent locations, as there are 32 total planes.

In some arrangements, instead of using M independent block locations in a full-width configuration, the superblock manager 130 may select a block from each of the N independent locations to form a superblock, where N is less than M (e.g., N=M−X). This allows improved flexibility for remapping blocks while maintaining the same block size and performance throughout the lifetime of the storage device. The unused X blocks (available, healthy, and not bad blocks) with respect to a superblock are staggered so that all available independent locations are used when allocating superblocks. The greater the value of X, the greater the flexibility for remapping and the greater the ability to support plane/die failures at a lower but fixed performance throughout the lifetime of the non-volatile memory 140.

As shown, superblocks 320a, 320b, 320c, 320d, 320e, and 320f (collectively 320a-320f) are formed. Each of the superblocks 320a-320f is formed with a block from N planes, where N=28 as shown. Accordingly, each of the superblocks 320a-320f is formed using N=28 independent locations, when there are M=32 total available independent locations for superblocks. Such mechanism is referred to as creating less-than-full-width or partial-width superblocks. In some arrangements, M is a predefined number based on how the dies 142a-148d are physically arranged and managed. In other words, M can be identified by the superblock manager 130 by default. Independent locations (e.g., planes) on the dies 210e-210p that do not belong in any of the superblocks 320a-320f initially are referred to as initially unallocated blocks 330.

As shown, the superblock manager 130 may initially select a block from each plane of the dies 210a-210n to form the superblock 320a. The superblock 320a does not initially include a block in independent locations in dies 210o and 210p. The superblock manager 130 may initially select a block from each plane of the dies 210o, 210p, and 210a-210l to form the superblock 320b. The superblock 320b does not initially include a block in independent locations in dies 210m and 210n. The superblock manager 130 may initially select a block from each plane of the dies 210m-210p and 210a-210j to form the superblock 320c. The superblock 320c does not initially include a block in independent locations in dies 210k and 210l. The superblock manager 130 may initially select a block from each plane of the dies 210k-210p and 210a-210h to form the superblock 320d. The superblock 320d does not initially include a block in independent locations in dies 210i and 210j. The superblock manager 130 may initially select a block from each plane of the dies 210i-210p and 210a-210f to form the superblock 320e. The superblock 320e does not initially include a block in independent locations in dies 210g and 210h. The superblock manager 130 may initially select a block from each plane of the dies 210g-210p and 210a-210d to form the superblock 320f. The superblock 320f does not initially include a block in independent locations in dies 210e and 210f. The independent locations initially excluded from or unused for a given superblock is referred to as the X unused independent locations, where X=4 in this example. As shown, the X unused independent locations may be different for different superblocks.

While FIG. 3 shows that each superblock includes a block from each independent location that is a plane, in other examples, each superblock can include two or more blocks from each independent location that is a plane. In some examples in which each independent location is a die, each superblock can include one block or multiple blocks from each independent location.

Figure 4:
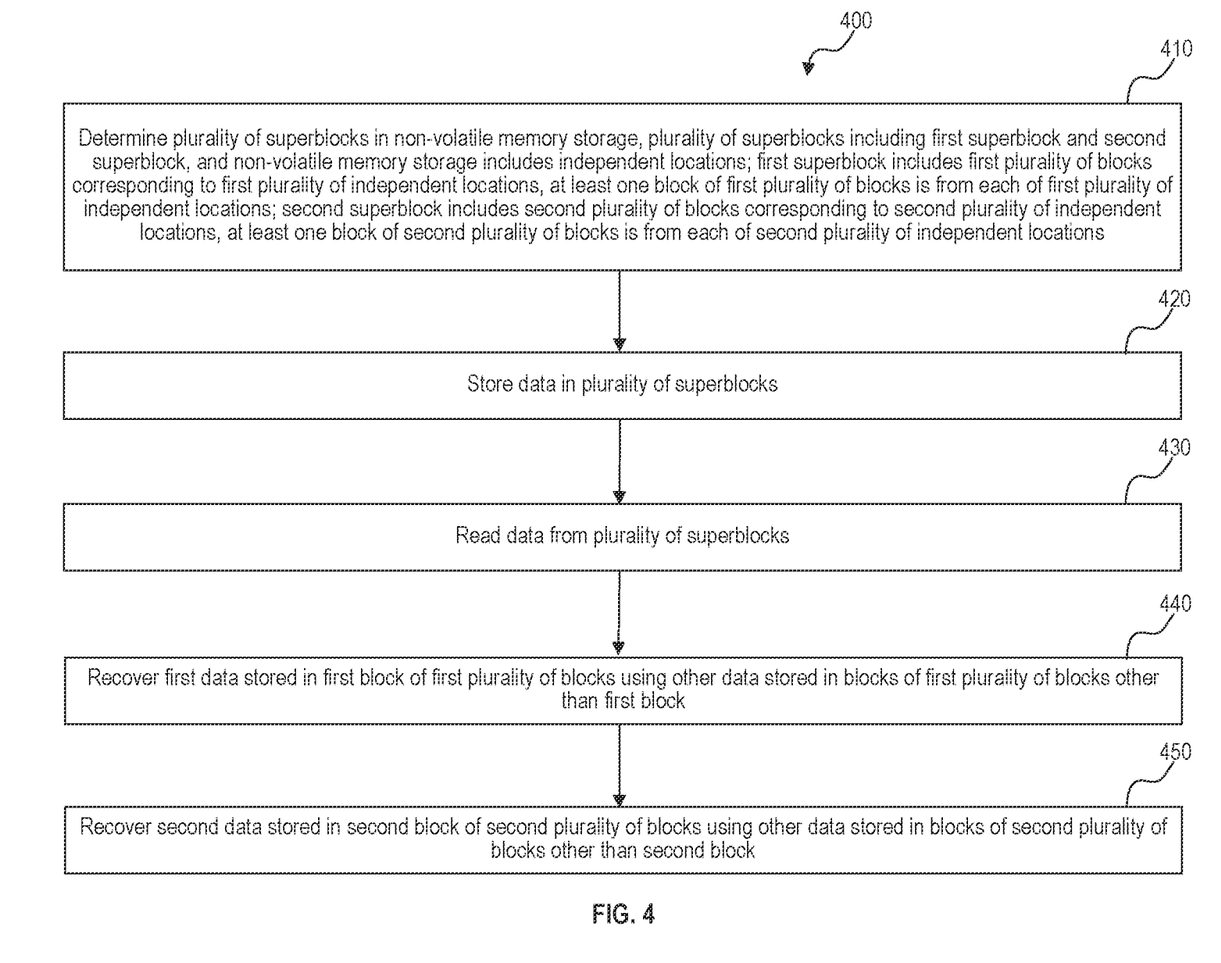
FIG. 4 is a flowchart diagram illustrating a method for initial superblock formation, according to some arrangements.

FIG. 4 is a flowchart diagram illustrating a method 400 initial superblock formation, according to some arrangements. Referring to FIGS. 1, 3, and 4, the method 400 can be performed by the controller 120, including the superblock manager 130. The method 400 relates to initially determining the superblocks in some arrangements.

At 410, the superblock manager 130 determines a plurality of superblocks (e.g., the superblocks 320a-320f) in a non-volatile memory storage (e.g., the non-volatile memory 140). The superblocks 320a-320f includes a first superblock 320a and a second superblock 320b. The non-volatile memory storage 140 includes independent locations (e.g., all available independent locations for forming superblocks, which is denoted as M).

The first superblock 320a includes a first plurality of blocks corresponding to a first plurality of N independent locations. At least one block of the first plurality of blocks is from each of the first plurality of independent locations. The second superblock 320b includes a second plurality of blocks corresponding to a second plurality of N independent locations. At least one block of the second plurality of blocks is from each of the second plurality of independent locations.

A first number N of the first plurality of independent locations is less than a number M of the total number of independent locations available for superblocks. Likewise, a second number N of the second plurality of independent locations is less than the number M of the total number of independent locations available for superblocks. In some examples as shown in FIG. 3, the first number and the second number are the same.

In some arrangements, the first plurality of independent locations of the first superblock 320a includes at least one independent location (e.g., the planes on the dies 210m and 210n) that is different from any independent location of at least one of the plurality of superblocks (e.g., the second plurality of independent locations for the second superblock 320b). In some arrangements, the second plurality of independent locations of the second superblock 320b includes at least one independent location (e.g., the planes on the dies 210o and 210p) that is different from any independent location of at least one of the plurality of superblocks (e.g., the first plurality of independent locations for the first superblock 320a).

In some examples as shown in FIG. 3, each of the independent locations includes one of a plurality of planes in the non-volatile memory storage 140. As shown in FIG. 3, each of the dies 210a-210p has two planes, thus M=32. The plurality of planes includes a first plurality of planes (e.g., first planes of the dies 210a-210n shown within the dashed lines denoting the first superblock 320a) and a second plurality of planes (e.g., second planes of the dies 210o, 210p, and 210a-210l shown within the dashed lines denoting the second superblock 320b). Each of the first plurality of independent locations includes or corresponds to one of the first plurality of planes. Each of the second plurality of independent locations includes or corresponds to one of the second plurality of planes.

In other examples, each of the independent locations includes one of a plurality of dies (e.g., the dies 210a-210p) in the non-volatile memory storage 140. The plurality of dies 210a-210p includes a first plurality of dies and a second plurality of dies. Each of the first plurality of independent locations includes one of the first plurality of dies. Each of the second plurality of independent locations includes one of the second plurality of dies.

Each of the superblocks is a RAID structure for redundancy protection. Data stored in the blocks of each superblock are coded using suitable ECC such that when data stored in one block needs to be recovered, data stored in the rest of the blocks can be used to determine the data stored in that block. Accordingly, the first plurality of blocks are grouped together for first redundancy protection among the first plurality of blocks. The second plurality of blocks are grouped together for second redundancy protection among the second plurality of blocks.

In some arrangements, at 420, the controller 120 stores data in the plurality of superblocks 320a-320f. At 430, the controller 120 reads the data from the plurality of superblocks 320a-320f and provides the same to the host 101.

In some arrangements at 440, the controller 120 (e.g., the error correction system) recovers first data stored in a first block of the first plurality of blocks of the first superblock 320a using other data stored in other blocks of the first superblock 320a (e.g., blocks of the first plurality of blocks other than the first block). In some arrangements at 450, the controller 120 (e.g., the error correction system) recovers second data stored in a second block of the second plurality of blocks of the second superblock 320b using other data stored in other blocks of the second superblock 320b (e.g. blocks of the second plurality of blocks other than the second block).

When independent locations (e.g., planes in FIG. 3, but also extends to dies as well) are utilized to form superblocks in this manner, bad blocks be replaced by available blocks from the same independent location as well as the X unused independent locations for the given superblock in order to maintain independence between all the blocks in the superblock. Accordingly, N=M-X. There are M/X superblocks before a repeated set of the same independent locations used.

Figure 5:
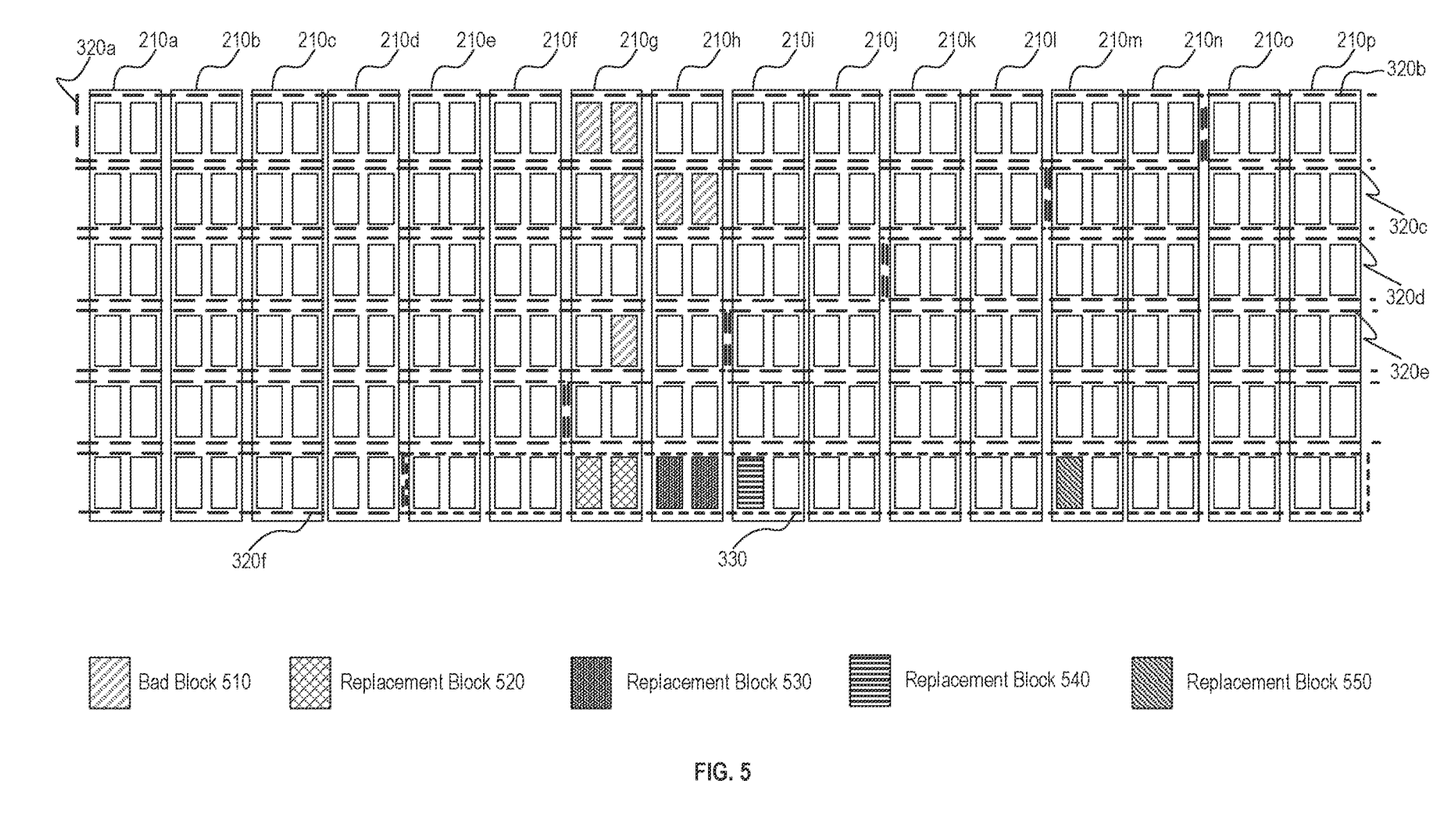
FIG. 5 is a schematic diagram illustrating block replacement for superblocks, according to some arrangements.

FIG. 5 is a schematic diagram illustrating block replacement for superblocks, according to some arrangements. Referring to FIGS. 1 and 3-5, FIG. 5 shows the same superblocks 320a-320f initially formed in the manner shown in and described with respect to FIGS. 3 and 4. Bad blocks 510 occur for the superblock 320a, 320b, and 320d. Specifically, the superblock 320a has a bad block 510 in each of the two planes of die 210g. The superblock 320b has a bad block 510 in one plane of die 310g and in each of the two planes of die 210h. The superblock 320d has a bad block 510 in a plane in die 210g. The bad blocks 510 may be initial bad blocks or grown bad blocks.

In some arrangements, in response to detecting a bad block 510 for a superblock, the superblock manager 130 replaces the bad block 510 with an unused block from the same independent location or from one of the X unused independent locations for that superblock. In response to determining that there are no unused blocks in these independent locations, the superblock cannot be repaired and is retired. The constituent blocks of the retired superblock become unused locations and can now be made available to replace bad blocks in other superblocks.

Figure 6:
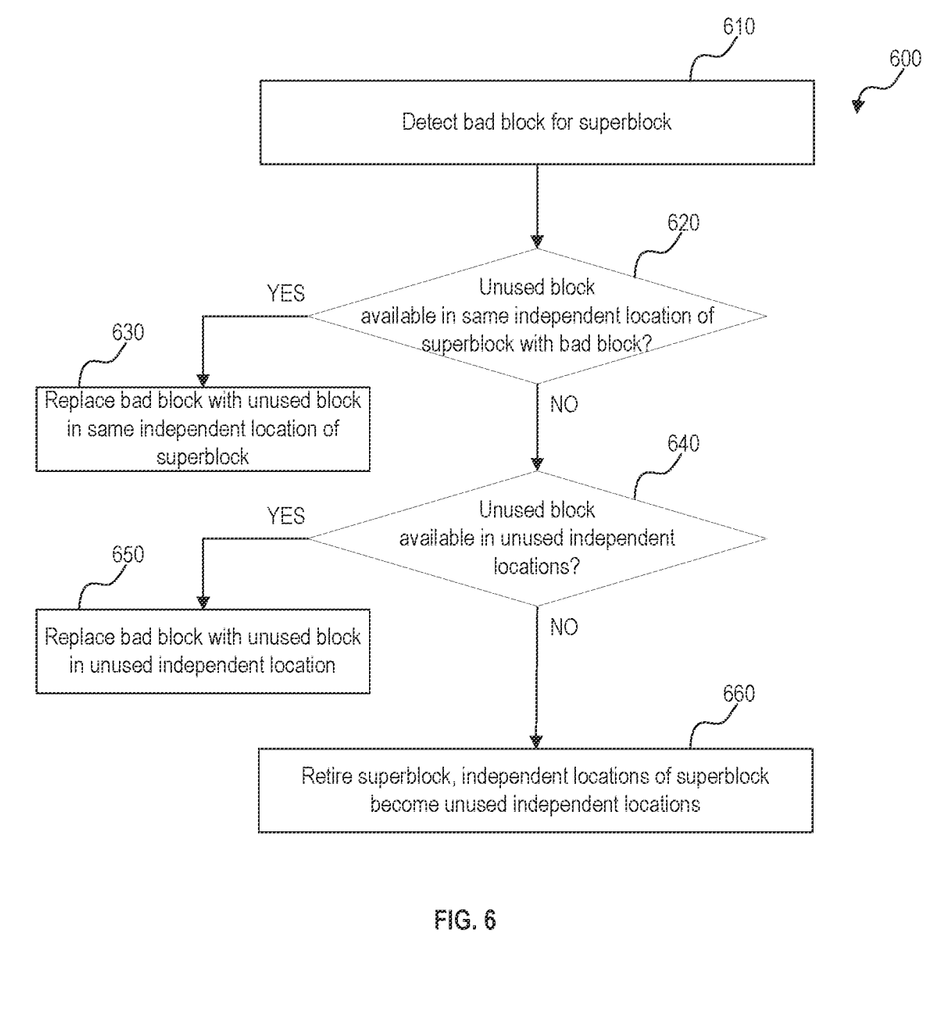
FIG. 6 is a flowchart diagram illustrating a method for replacing blocks for a superblock, according to some arrangements.

FIG. 6 is a flowchart diagram illustrating a method 600 for replacing blocks for a superblock, according to some arrangements. Referring to FIGS. 1 and 3-6, the method 600 can be performed by the controller 120, including the superblock manager 130.

At 610, the superblock manager 130 detects a bad block for a superblock. The superblock manager 130 may detect that a block is bad in response to receiving a signal from the non-volatile memory 140 or a channel controller that indicates that the block, the plane of which the block is located, or the die has failed.

For example, the superblock manager 130 detects that that some of the first plurality of blocks of the first superblock 320a have become bad blocks 510, where the bad blocks 510 are in independent locations of the first plurality of independent locations. As shown in FIG. 5, the superblock 320a has a bad block 510 in each of the two planes of die 210g. In another example, the superblock manager 130 detects that that some of the second plurality of blocks of the second superblock 320b have become bad blocks 510, where the bad blocks 510 are in independent locations of the second plurality of independent locations. As shown in FIG. 5, the superblock 320b has a bad block 510 in one plane of die 310g and in each of the two planes of die 210h. In another example, the superblock manager 130 detects that that a block of the superblock 310d has become a bad block 510, where the bad block 510 is in an independent location initially included in the superblock 310d. As shown in FIG. 5, the superblock 320d has a bad block 510 in a plane in die 210g.

At 620, the superblock manager 130 determines whether any unused block in the same independent location of the superblock with the bad block is available. That is, the superblock manager 130 first checks whether there is any unused block that is available for the replacement, where such unused block is located in the same independent location as the failed block. At 630, in response to determining that an unused block in the same independent location of the bad block is available (620: YES), the superblock manager 130 replaces the bad block with the unused block in the same independent location of the bad block. Such replacement is sometimes referred to as vertical remapping. The superblock manager 130 replaces a block with another block by updating the list of constituent blocks (e.g., updating the list of physical addresses of the block) for the superblock.

For example, in response to detecting the bad blocks 510 in each of the two planes of die 210g for the first superblock 320a, the superblock manager 130 determines that an unused replacement block 520 (of the initially unallocated blocks 330) in each of the two planes of die 210g is available. Thus, the superblock manager 130 replaces the bad blocks 510 of the superblock 320a with the replacement blocks 520.

In another example, in response to detecting the bad blocks 510 in each of the two planes of die 210h for the second superblock 320b, the superblock manager 130 determines that an unused replacement block 530 (of the initially unallocated blocks 330) in each of the two planes of die 210h is available. Thus, the superblock manager 130 replaces the bad blocks 510 in die 210h of the superblock 320b with the replacement blocks 530.

In some arrangements, in response to determining that no unused block in the independent location of the bad block is available (620: NO), the superblock manager 130 determines whether any unused block in any one of the unused independent locations with respect to the superblock is available, at 640. In response to determining that an unused block in one of the unused independent locations with respect to the superblock is available (640: YES), superblock manager 130 replaces the bad block with the unused block in the one of the unused independent locations with respect to the superblock at 650. Such replacement is sometimes referred to as horizontal remapping. The superblock manager 130 replaces a block with another block by updating the list of constituent blocks (e.g., updating the list of physical addresses of the block) for the superblock.

For example, after replacing with the replacement blocks 520, there is no more available unused block in the independent locations on either plane of the die 210g. In response to detecting the bad block 510 in a plane of die 210g for the second superblock 320b and due to the fact that there is no more available unused blocks in the same independent locations on either plane of the die 210g, the superblock manager 130 determines that an unused replacement block 550 (of the initially unallocated blocks 330) in a plane of die 210m is available. The unused replacement block 550 is one of the X unused independent locations for the second superblock 320b. Thus, the superblock manager 130 replaces the bad blocks 510 in die 210g of the superblock 320b with the replacement block 550.

In another example, in response to detecting the bad block 510 in a plane of die 210g for the superblock 320d and due to the fact that there is no more available unused blocks in the same independent locations on either plane of the die 210g, the superblock manager 130 determines that an unused replacement block 540 (of the initially unallocated blocks 330) in a plane of die 210i is available. The unused replacement block 540 is one of the X unused independent locations for the superblock 320d. Thus, the superblock manager 130 replaces the bad blocks 510 in die 210g of the superblock 320d with the replacement block 540.

The horizontal remapping at 650 uses an unused replacement block in one of the X unused independent locations for the superblock to replace any bad block, and therefore maintains independence, superblock size and performance, given superblock performance drops in proportion to the superblock size.

At 660, in response to determining that no unused block in the unused independent location with respect to the superblock is available (640: NO), the superblock manager 130 retires the superblock. The blocks of the retired superblock then become unused independent locations for at least another superblock and blocks that can be used to replace other blocks of at least another superblock. In that regard, the number of constituent blocks in each superblock remains to be N. In some examples, retiring a superblock refers to deallocating and/or erasing data on all constituent blocks associated with the superblock.

In some arrangements in which unused blocks in multiple unused independent locations exist, a block from one of the unused independent locations with the most unused blocks for replacement is selected. For example, in response to determining that two unused independent locations (e.g., two planes or two dies) have unused blocks available at 640: YES, and that there are 4 unused blocks available at the first unused independent location and 2 unused blocks available at the second unused independent location, the superblock manager 130 selects a block from the first unused independent location to replace the bad block. The superblock manager 130 tracks the number of blocks available for each of the unused independent locations and/or the status of initially unallocated blocks 330.

In some arrangements, in response to determining that an independent location (e.g., a plane or die) fails, the method 600 can be used on a block-by-block basis for each resultant bad block in the independent location. For example, if a plane fails, every superblock that has been retired pursuant to the method 600 frees up N-1 blocks to enable rebuilding N-1 other superblocks by means of remapping at 630 or 650.

Maintaining the fixed superblock size as described herein is desirable for a number of datacenter-orientated SSD protocols, particularly when multiple outstanding streams of data are being used and/or when the host has knowledge of the superblock size and manages the data written to superblocks according to the size. Maintaining the superblock size constant allows less reporting and size management and a more efficient implementation, given that I/O consistency (consistent performance) is important on datacenter SSD applications.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A non-transitory computer-readable media comprising computer-readable instructions, such that, when executed, by a processor, causes the processor to:
   determine a plurality of superblocks in a non-volatile memory storage, the plurality of superblocks comprising a first superblock and a second superblock, and the non-volatile memory storage comprises available independent locations, the available independent locations comprise a first plurality of independent locations and a second plurality of independent locations, wherein determining includes:
   allocating to the first superblock a first plurality of blocks corresponding to the first plurality of independent locations, wherein at least one block of the first plurality of blocks is from each of the first plurality of independent locations,
   allocating to the second superblock a second plurality of blocks corresponding to the second plurality of independent locations, wherein at least one block of the second plurality of blocks is from each of the second plurality of independent locations, and
   wherein a number of the first plurality of independent locations is less than a number of the available independent locations, and a number of the second plurality of independent locations is less than the number of the available independent locations, and the first plurality of independent locations includes at least one independent location that is different from any independent location of the second plurality of independent locations, and
   wherein determining further includes, in connection with allocating to the first and second superblocks, initially excluding a plurality of unused blocks in the non-volatile memory storage from the plurality of superblocks, and reserving the plurality of unused blocks is to replace bad blocks in the determined plurality of superblocks; and
   store data in or read the data from the plurality of superblocks.

2. The non-transitory computer-readable media of claim 1, wherein
   each of the available independent locations comprises one of a plurality of dies in the non-volatile memory storage, the plurality of dies comprises a first plurality of dies and a second plurality of dies;
   each of the first plurality of independent locations comprises one of the first plurality of dies; and
   each of the second plurality of independent locations comprises one of the second plurality of dies.

3. The non-transitory computer-readable media of claim 1, wherein
   each of the available independent locations comprises one of a plurality of planes in the non-volatile memory storage, the plurality of planes comprises a first plurality of planes and a second plurality of planes;
   each of the first plurality of independent locations comprises one of the first plurality of planes; and
   each of the second plurality of independent locations comprises one of the second plurality of planes.

4. The non-transitory computer-readable media of claim 1, wherein
   the first plurality of blocks are grouped together for first redundancy protection among the first plurality of blocks; and
   the second plurality of blocks are grouped together for second redundancy protection among the second plurality of blocks.

5. The non-transitory computer-readable media of claim 1, wherein the processor is further caused to:
   recover first data stored in a first block of the first plurality of blocks using other data stored in blocks of the first plurality of blocks other than the first block; or
   recover second data stored in a second block of the second plurality of blocks using other data stored in blocks of the second plurality of blocks other than the second block.

6. The non-transitory computer-readable media of claim 1, wherein the second plurality of independent locations includes at least one independent location that is different from any independent location of the first plurality of independent locations.

7. The non-transitory computer-readable media of claim 1, wherein the processor is further caused to:
   detect one of the first plurality of blocks in an independent location of the first plurality of independent locations has become a bad block;
   determine whether an unused block of the plurality of unused blocks in the independent location of the first plurality of independent locations is available; and
   in response to determining that the unused block in the independent location of the first plurality of independent locations is available, replace the bad block with the unused block in the independent location of the first plurality of independent locations.

8. The non-transitory computer-readable media of claim 7, wherein the processor is further caused to:
   in response to determining that no unused block in the independent location of the first plurality of independent locations is available, determine whether any unused block in any one of the unused independent locations is available; and
   in response to determining that the unused block in one of the unused independent locations is available, replace the bad block with the unused block in the one of the unused independent locations.

9. The non-transitory computer-readable media of claim 8, wherein the processor is further caused to:
   in response to determining that no unused block in any of the unused independent locations is available, retire the first superblock.

10. A storage device, comprising:
    a non-volatile storage comprising available independent locations, the available independent locations comprise a first plurality of independent locations and a second plurality of independent locations; and
    a controller configured to:
    determine a plurality of superblocks in the non-volatile memory storage, the plurality of superblocks comprising a first superblock and a second superblock, wherein
    the first superblock comprises a first plurality of blocks corresponding to the first plurality of independent locations, at least one block of the first plurality of blocks is from each of the first plurality of independent locations, the second superblock comprises a second plurality of blocks corresponding to the second plurality of independent locations, at least one block of the second plurality of blocks is from each of the second plurality of independent locations, and a number of the first plurality of independent locations is less than a number of the available independent locations, and a number of the second plurality of independent locations is less than the number of the available independent locations, wherein the first plurality of independent locations includes at least one independent location that is different from any independent location of the second plurality of independent locations;

wherein determining the plurality of superblocks further includes initially excluding a plurality of unused blocks in the non-volatile memory storage from the plurality of superblocks, and reserving the plurality of unused blocks to replace bad blocks in the determined plurality of superblocks; and store data in or read the data from the plurality of superblocks.

11. The storage device of claim 10, wherein the controller configured to:

recover first data stored in a first block of the first plurality of blocks using other data stored in blocks of the first plurality of blocks other than the first block; or recover second data stored in a second block of the second plurality of blocks using other data stored in blocks of the second plurality of blocks other than the second block.

12. The storage device of claim 10, wherein the controller is further configured to:

detect one of the first plurality of blocks in an independent location of the first plurality of independent locations has become a bad block;

determine whether an unused block of the plurality of unused blocks in the independent location of the first plurality of independent locations is available; and in response to determining that the unused block in the independent location of the first plurality of independent locations is available, replace the bad block with the unused block in the independent location of the first plurality of independent locations.

13. The storage device of claim 12, wherein the controller is further configured to:

in response to determining that no unused block in the independent location of the first plurality of independent locations is available, determine whether any unused block in any one of the unused independent locations is available; and in response to determining that the unused block in one of the unused independent locations is available, replace the bad block with the unused block in the one of the unused independent locations.

14. The storage device of claim 13, wherein the controller is further configured to:

in response to determining that no unused block in any of the unused independent locations is available, retire the first superblock.

15. A method, comprising:

determining a plurality of superblocks in a non-volatile memory storage, the plurality of superblocks comprising a first superblock and a second superblock, and the non-volatile memory storage comprises available independent locations, the available independent locations comprise a first plurality of independent locations and a second plurality of independent locations, wherein the first superblock comprises a first plurality of blocks corresponding to the first plurality of independent locations, at least one block of the first plurality of blocks is from each of the first plurality of independent locations, the second superblock comprises a second plurality of blocks corresponding to the second plurality of independent locations, at least one block of the second plurality of blocks is from each of the second plurality of independent locations, and a number of the first plurality of independent locations is less than a number of the available independent locations, and a number of the second plurality of independent locations is less than the number of the available independent locations, wherein the first plurality of independent locations includes at least one independent location that is different from any independent location of the second plurality of independent locations;

wherein determining the plurality of superblocks further includes initially excluding a plurality of unused blocks in the non-volatile memory storage from the plurality of superblocks, and reserving the plurality of unused blocks to replace bad blocks in the determined plurality of superblocks; and storing data in or reading the data from the plurality of superblocks.

16. The method of claim 15, further comprising:

detecting one of the first plurality of blocks in an independent location of the first plurality of independent locations has become a bad block;

determining whether an unused block of the plurality of unused blocks in the independent location of the first plurality of independent locations is available; and in response to determining that the unused block in the independent location of the first plurality of independent locations is available, replacing the bad block with the unused block in the independent location of the first plurality of independent locations.

17. The method of claim 15, further comprising:

in response to determining that no unused block in the independent location of the first plurality of independent locations is available, determine whether any unused block in any one of the unused independent locations is available; and in response to determining that the unused block in one of the unused independent locations is available, replace the bad block with the unused block in the one of the unused independent locations.

* * * * *